United States Patent
Griffin

(10) Patent No.: US 7,382,359 B2
(45) Date of Patent: Jun. 3, 2008

(54) SMART MULTI-TAP TEXT INPUT

(75) Inventor: Jason Griffin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 704 days.

(21) Appl. No.: 10/861,372

(22) Filed: Jun. 7, 2004

(65) Prior Publication Data

US 2006/0033718 A1    Feb. 16, 2006

(51) Int. Cl.
G09G 5/00 (2006.01)
H03K 17/94 (2006.01)
H03M 11/00 (2006.01)

(52) U.S. Cl. .................................. 345/169; 341/22

(58) Field of Classification Search ............... 345/168, 345/156, 169; 341/22, 26, 23, 67, 106; 715/810, 715/532; 379/88.1; 710/1; 368/168
See application file for complete search history.

(56) References Cited

U.S. PATENT DOCUMENTS

| | | | |
|---|---|---|---|
| 4,891,786 A | 1/1990 | Goldwasser et al. | |
| 5,392,338 A * | 2/1995 | Danish et al. | 379/93.27 |
| 6,011,554 A | 1/2000 | King et al. | |
| 6,219,731 B1 | 4/2001 | Gutowitz | |
| 6,286,064 B1 | 9/2001 | King et al. | |
| 6,307,549 B1 | 10/2001 | King et al. | |
| 6,744,422 B1 * | 6/2004 | Schillings et al. | 345/169 |
| 7,159,191 B2 * | 1/2007 | Koivuniemi | 715/827 |
| 2003/0193478 A1 | 10/2003 | Ng et al. | |
| 2003/0234821 A1 | 12/2003 | Pugliese | |
| 2004/0044422 A1 | 3/2004 | Fux et al. | |
| 2004/0056844 A1 | 3/2004 | Gutowitz et al. | |

FOREIGN PATENT DOCUMENTS

WO    WO 02/052816    7/2002

OTHER PUBLICATIONS

Lee Butts and Andy Cockburn, An Evaluation of Mobile Phone Text Input Methods, Copyright 2001, Australian Computer Society, Inc., pp. 55-59.

* cited by examiner

*Primary Examiner*—Amr Awad
*Assistant Examiner*—Stephen G Sherman
(74) *Attorney, Agent, or Firm*—Ridout & Maybee LLP

(57) ABSTRACT

A system and method for resolving ambiguities in multi-tap text input resulting from successive keystrokes of the same key. The keystroke timing is evaluated to assess whether a default understanding of the keystrokes should be rejected in favour of an alternative interpretation. The timing between successive keystrokes is compared to a timing value to determine if the successive keystrokes are part of the same character input or constitute separate character inputs. The system and method assist in resolving ambiguities inherent in receiving multi-tap input through a reduced-key input device.

24 Claims, 5 Drawing Sheets

SMART MULTI-TAP TEXT INPUT

FIELD OF THE INVENTION

The present invention relates to multi-tap text input using a reduced keyboard. More particularly, the present invention relates to an improved method and system for resolving ambiguities in multi-tap text input.

BACKGROUND OF THE INVENTION

The layout of the universal QWERTY keyboard is familiar to all typists and computer users. In this configuration, each alphanumeric symbol is assigned a unique key. This configuration has dominated text input systems (including typewriters and computers) for over a century. In recent years, however, the development of new technologies like mobile telephones, personal digital assistants (PDAs), and wireless two-way messaging devices has lead to a reconsideration of the configuration of keypads or keyboards. For example, in the case of mobile telephones, three or more letters have been assigned or associated with each numeric key. In the case of some two-way wireless messaging devices, to conserve space the devices have been designed with a two-symbol-per-key keyboard. For example, such a device may feature a reduced-key QWERTY keyboard, wherein the conventional QWERTY layout is maintained, but two adjacent letters are associated with each key, e.g. one key is used for entering both the letters "E" and "R".

In a reduced-key input device, the keys have an associated sequence of alphanumeric symbols or characters. For example, a key may be associated with the letters JKL, as is the case with the "5" key on a telephone keypad. Devices that use a reduced-key input interface for receiving text input typically operate in one of two modes. The first mode is a "multi-tap" mode. In multi-tap mode, the user selects one of the alphanumeric symbols or characters associated with a key by hitting the key a number of times in succession corresponding to the position of the symbol in the sequence. For example, to enter the letter "J", the user hits the "5" key once. To enter the letter "L", the user hits the "5" key three times.

Another mode of operation is a predictive mode in which the user only hits the key associated with the desired symbol once, without specifying which of two or more symbols the user actually wants. Once the user has pressed a number of keys, the device uses predictive algorithms to attempt to guess which of various possible combinations of symbols the user was most likely attempting to define. The user may be provided with a pick-list of candidates for selection. In this mode, the user only enters one keystroke for each desired symbol or character.

When operating in the multi-tap mode, a difficulty arises in entering two successive symbols when those two symbols are associated with the same key. For example, in a two-symbol-per-key context a key may be associated with the letters ER. When a user strikes this key three times in succession it creates an ambiguity in determining the desired input. Three keystrokes may mean the user wants to enter RE, or ER, or EEE.

To resolve this ambiguity, devices operating in multi-tap mode typically employ a default rule, whereby the first two keystrokes will be interpreted as a multi-tap selection of the letter R. Because the user has reached the end of the sequence associated with the key, the next keystroke is interpreted as being associated with the input of a new character, i.e. the letter E. Accordingly, the default understanding of three keystrokes is an output of RE.

To overcome this default rule and obtain an alternative output, like ER or EEE, the device may provide the user with a "next" key to indicate that the user is done selecting a character and that the cursor should be advanced to the next location. Subsequent keystrokes will be interpreted as the input of a new character. Accordingly, to input ER, the user would strike the "ER" key once, hit the "next" key, and then strike the "ER" key twice.

Another method of overriding the default rule is to wait for a timeout to occur. Typically, multi-tap input devices will provide a "timeout" feature, wherein the device presumes that a user is finished inputting a character if a sufficiently long period of time elapses following a keystroke. If a timeout occurs, then the device may advance the cursor to the next location in a text field on the presumption that any subsequent keystrokes will relate to a new character. Accordingly, to input ER, the user would strike the "ER" key once, wait until the cursor advances, and then strike the "ER" key twice.

It will be appreciated that using the "next" key to manually advance the cursor to the next location, or waiting for a timeout to automatically advance the cursor, results in a text input system that interferes with a user's keystroke cadence or rhythm. Accordingly, a need exists for another method of resolving multi-tap text input ambiguities.

SUMMARY OF THE INVENTION

The present invention provides a method of resolving multi-tap text input ambiguities based upon the timing of successive keystrokes of a selected key.

In one aspect, the present invention provides a method for resolving ambiguities in multi-tap text input received through a reduced-key input device, a key of the input device having at least two associated text characters. The method includes the steps of receiving a first keystroke signal associated with the key; receiving a second keystroke signal associated with the key; comparing a time between the first keystroke signal and the second keystroke signal with a timing value; and selecting between a default display output and an alternative display output based upon the comparison.

In another aspect the present invention provides a multi-tap text input system for use with a device receiving multi-tap text input. The system includes a keystroke timing component for storing keystroke timing information including a timing value; and a multi-tap text input module for receiving first and second keystroke input signals associated with a key, the multi-tap input module having a timing module for determining a time between the first and second keystroke input signals, a comparison component for comparing the timing value with the time determined by the timing module, and a selection component, wherein the selection component selects between a default display output and an alternative display output in response to the comparison component.

In yet a further aspect, the present invention provides a mobile device. The mobile device includes a reduced-key input device; a display; a memory containing keystroke timing information including a timing value; and a multi-tap text input module for receiving first and second keystroke input signals associated with a key, the multi-tap input module having a timing module for determining a time between the first and second keystroke input signals, a comparison component for comparing the timing value with the time determined by the timing module, and a selection component, wherein the selection component selects between a default display output and an alternative display output in response to the comparison component.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

DESCRIPTION OF SPECIFIC EMBODIMENTS

The following description of one or more specific embodiments of the invention does not limit the implementation of the invention to any particular computer programming language or system architecture. The present invention is not limited to any particular operating system, mobile device architecture, or computer programming language. Moreover, although some of the embodiments described below include mobile devices, the present invention is not limited to mobile devices, nor to wireless communications systems; rather, it may be embodied within any devices or terminals employing a multi-tap input interface, including handheld devices, mobile telephones, wireless two-way messaging devices, personal digital assistants (PDAs), personal computers, audio-visual terminals, and other devices.

Figure 1:
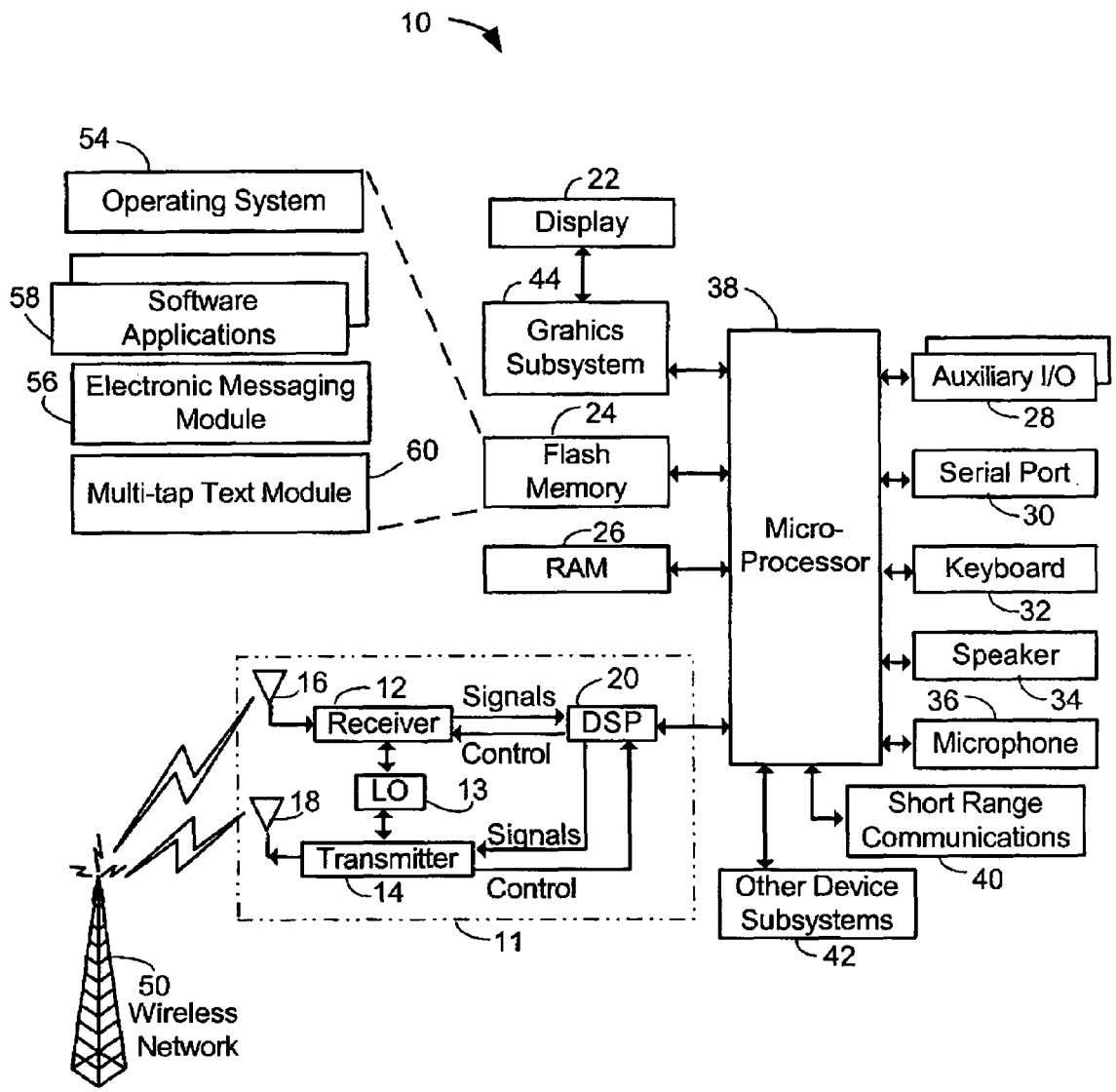
FIG. 1 shows a block diagram of a user device to which the present invention is applied in an example embodiment.

Referring now to the drawings, FIG. 1 is a block diagram of a user device to which the present invention is applied in an example embodiment. In the example embodiment, the user device is a two-way mobile communication device 10 having data and possibly also voice communication capabilities. In an example embodiment, the device 10 has the capability to communicate with other computer systems on the Internet. Depending on the functionality provided by the device 10, in various embodiments the device may be a data communication device, a multiple-mode communication device configured for both data and voice communication, a mobile telephone, a PDA enabled for wireless communication, or a computer system with a wireless modem, among other things. In various embodiments, the present invention may also be applied to handheld computing devices, such as PDAs and digital cameras, that are not enabled for communications.

In this embodiment, in which the device 10 is enabled for communications, the device 10 includes a communication subsystem 11, including a receiver 12, a transmitter 14, and associated components such as one or more, preferably embedded or internal, antenna elements 16 and 18, and a processing module such as a digital signal processor (DSP) 20. In some embodiments, the communication subsystem includes local oscillator(s) (LO) 13, and in some embodiments the communication subsystem 11 and a microprocessor 38 share an oscillator. As will be apparent to those skilled in the field of communications, the particular design of the communication subsystem 11 will be dependent upon the communication network in which the device 10 is intended to operate.

Signals received by the antenna 16 through a wireless communication network 50 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the communications network 50 via the antenna 18.

The device 10 includes the microprocessor 38 that controls the overall operation of the device. The microprocessor 38 interacts with communications subsystem 11 and also interacts with further device subsystems such as the graphics subsystem 44, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. The graphics subsystem 44 interacts with the display 22 and renders graphics or text upon the display 22.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of software applications 58 which control basic device operations, including at least data and voice communication applications for example, will normally be installed on the device 10 during manufacture. A typical data communication application may include an electronic messaging module 56 for allowing a user to receive, read, compose, and send text-based messages. Further software applications 58 may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22 through the graphics subsystem 44, or alternatively to an auxiliary I/O device 28. A user of device 10 may also compose data items within a software application 58, such as email messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless packet data network, (e.g. Mobitex™ or DataTAC™), which provides radio coverage to mobile devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

The keyboard 32 comprises a reduced-key input device. Accordingly, the keyboard 32 includes one or more keys that are associated with one or more symbols. The reduced-key input device is to be distinguished from the conventional QWERTY device, which includes some keys that have two associated symbols, such as the number keys and their associated punctuation or symbolic characters, i.e. the "7" key and the "&" symbol. With a conventional QWERTY keyboard, key combinations are used to distinguish between symbols on the same key. For example, the "7" key is normally associated with the number 7, unless the "7" key is struck while the SHIFT key is depressed, in which case the "7" key is associated with the "&" symbol. It will be understood that this type of conventional keyboard does not employ multi-tap input. The keyboard 32 shown in FIG. 1 comprises a multi-tap input device.

In accordance with the present invention, the device 10 includes a multi-tap text module 60 for receiving and interpreting input from the keyboard 32. The multi-tap text module 60 may also provide instructions to the graphics subsystem 44 regarding the characters or symbols to render on the display 22 based upon the input from the keyboard 32. It will be appreciated that the multi-tap text module 60 may interact with or be a part of other software applications, including the electronic messaging module 56, so as to enable those applications to receive and interpret user input from the keyboard 32. It will also be understood that the multi-tap text module 60 may be incorporated as a part of the operating system 54 for receiving and interpreting input signals from the keyboard 32 when operating in a multi-tap mode.

Figure 2:
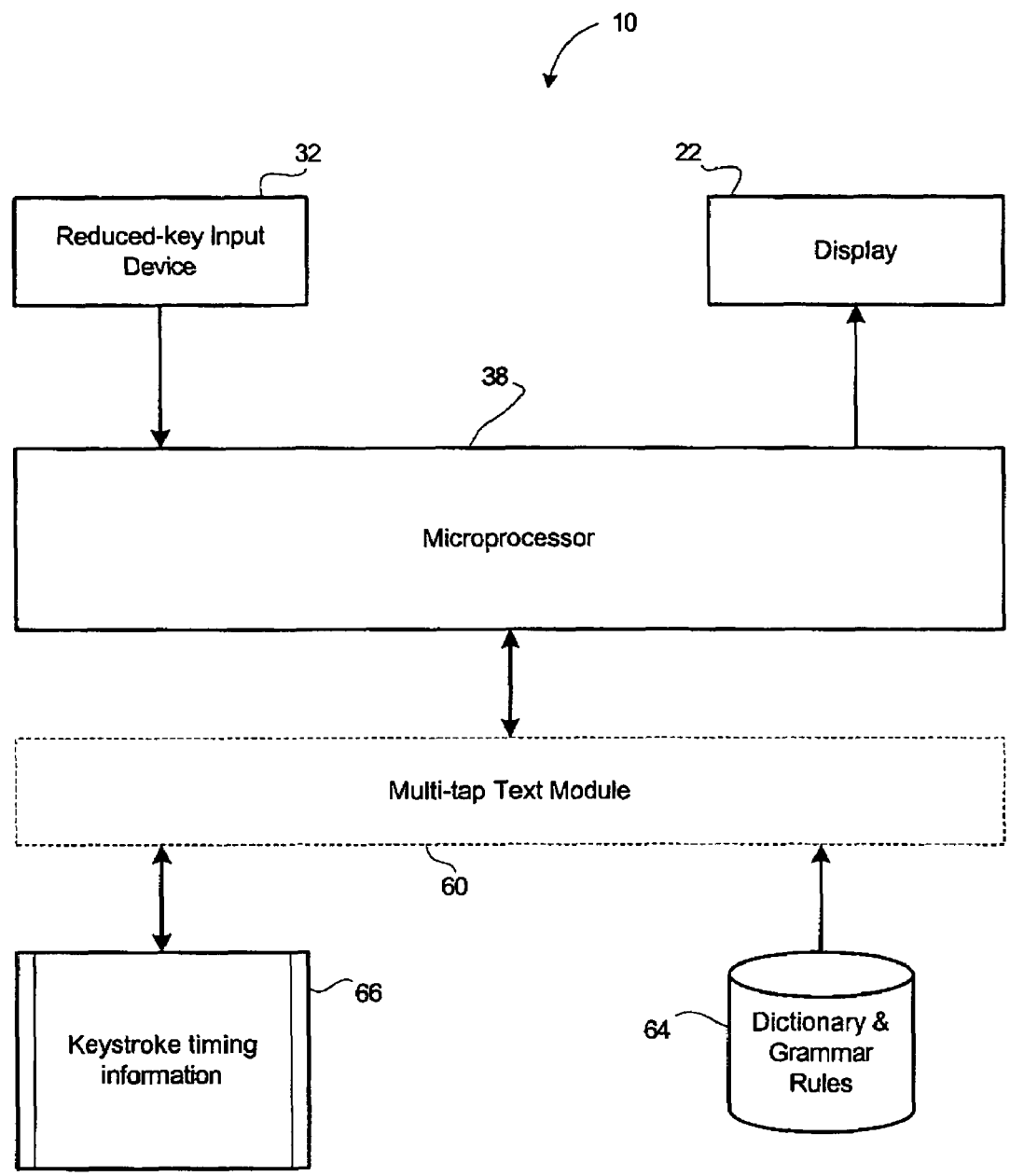
FIG. 2 shows an expanded diagram of a portion of the user device of FIG. 1.

FIG. 2 shows an expanded block diagram of the mobile device 10 shown in FIG. 1. The microprocessor 38 receives input signals from the keyboard 32. The input signals are indicative of the keystrokes registered by the keyboard 32. The microprocessor 38 also outputs signals to the display 22 for rendering text on the display 22.

The multi-tap text module 60 comprises a software application stored in memory and executed by the microprocessor 38. The device 10 further includes keystroke timing information 66 and, optionally, a dictionary and grammar rules database 64. The keystroke timing information 66 includes data regarding the timing between certain keystrokes for use by the multi-tap text module 60 in resolving ambiguities in the multi-tap text input. The keystroke timing information 66 may include one or more timing values, which are values or thresholds against which a current keystroke timing interval may be compared, as described in greater detail below. The keystroke timing information 66 is stored in memory on the device 10 and may be updated from time-to-time by the multi-tap text module 60.

The dictionary and grammar rules database 64 may store data regarding recognized keystroke combinations, probabilities associated with particular keystroke combinations and the associated text output, and/or grammar conditions for determining the probabilities attributable to different possible outputs for a given keystroke combination. Those of ordinary skill in the art will appreciate the range of other data and information that the dictionary and grammar rules database 64 may store to provide the multi-tap text module 60 with data for resolving certain ambiguities.

Figure 7:
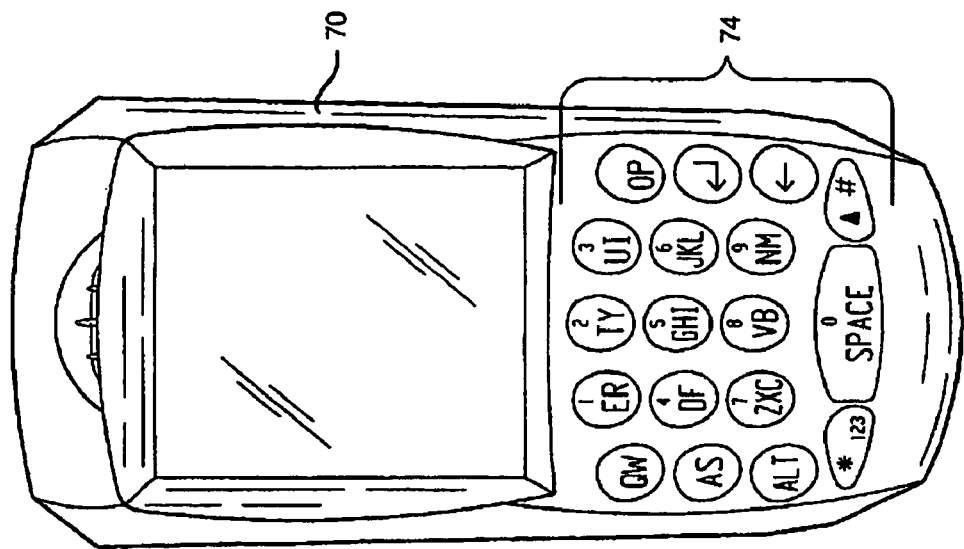
FIG. 7 shows, diagrammatically, a front view of another embodiment of a user device having a reduced-key user interface. similar components.
Figure 6:
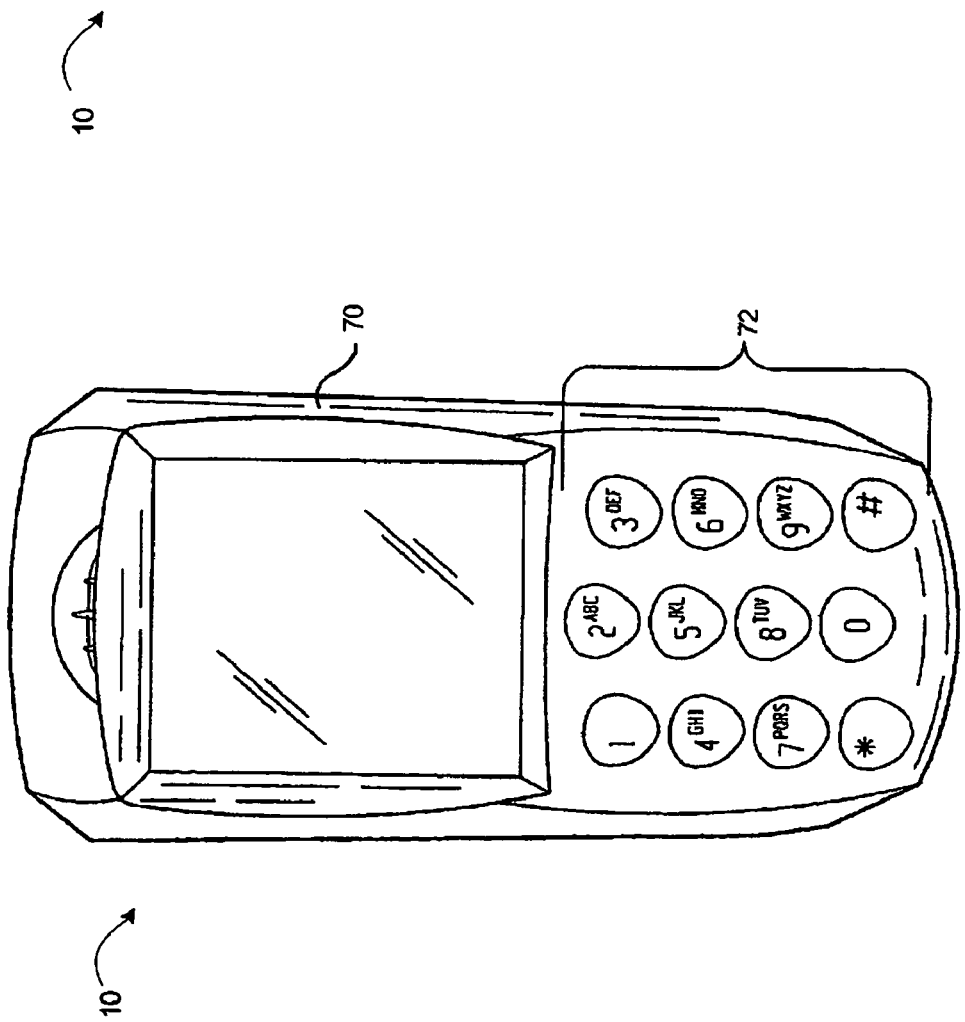
FIG. 6 shows, diagrammatically, a front view of an embodiment of a user device having a reduced-key user interface.

Reference is now made to FIGS. 6 and 7, which show a front view of example embodiments of the mobile device 10. In the example embodiments, the components and subsystems of mobile device 10 are housed within a hard plastic main body case 70 that is configured to be held with one or two hands while the device 10 is in use. The main body case 70 may be a single piece or may include two or more portions coupled together. For example, in one embodiment (not shown), the device comprises a "flip-open" device meaning that the main body case 70 includes two portions hinged together such that the two portions may be brought into closed contact with one another when the device is not in use. The various components of the flip-open device need not be located in the same portion of the main body case 70.

The case 70 may include a hook (not shown) so that it can be secured to a user's belt or pant's top, or it may be used in conjunction with a soft case (not shown) that can be mounted to the user's belt or pant's top and into which the mobile device 10 can be inserted for carrying. Mobile device 10 will typically be small enough to fit inside a standard purse or suit jacket pocket. The display is visible from the front of the device, as is the reduced-key keypad or keyboard.

In the embodiment shown in FIG. 6, the device 10 features a typical telephone keypad 72, wherein most of the numeric keys are associated with three or more letters. In the embodiment shown in FIG. 7, the device 10 features a reduced-key QWERTY keyboard 74 layout, wherein some of the keys are associated with two or more letters.

Figure 3:
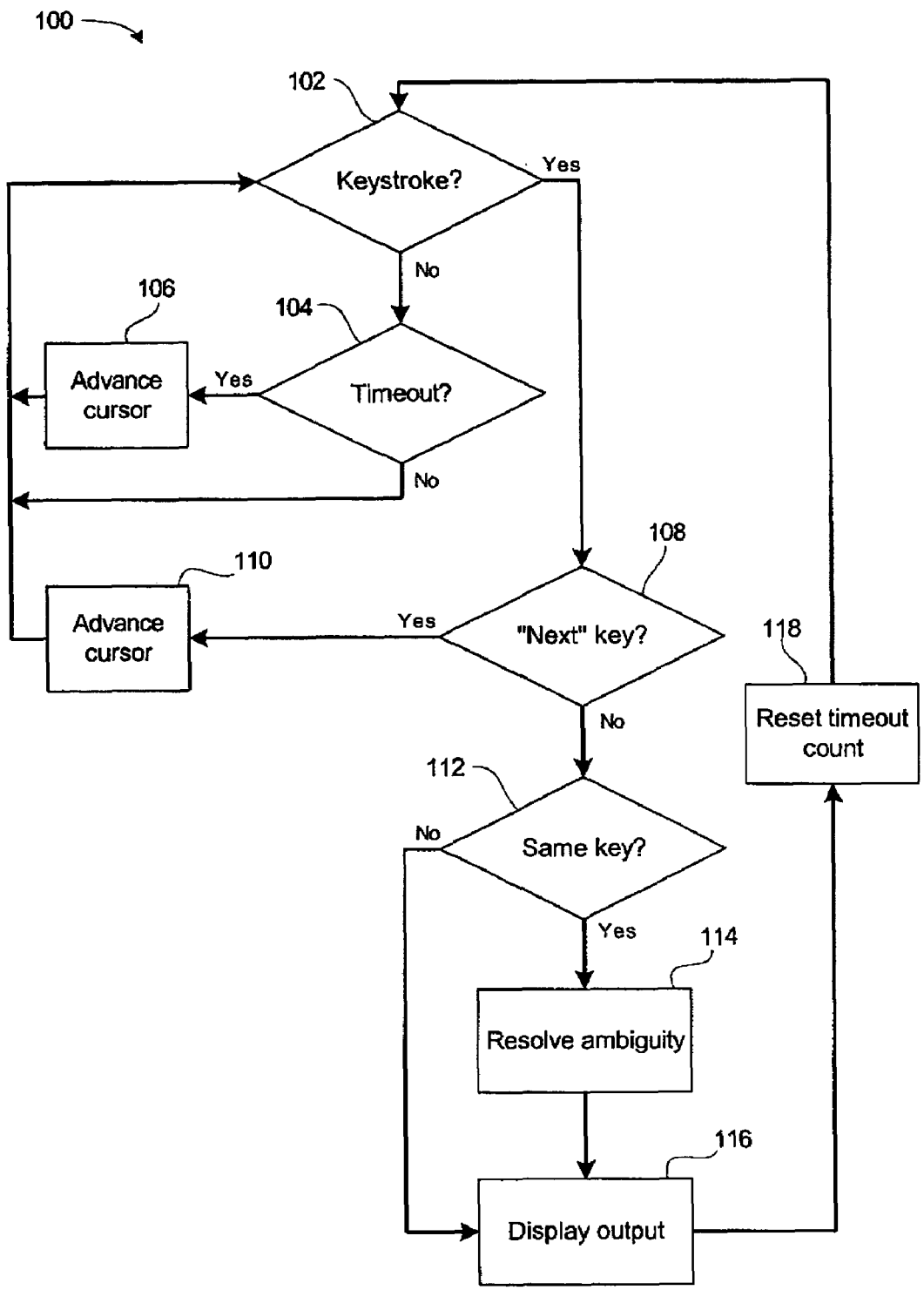
FIG. 3 shows, in flowchart form, a method of providing for multi-tap text input.

Reference is now made to FIG. 3, which shows, in flowchart form, a method 100 of providing for multi-tap text input. The method 100 is intended for use in the context of a system employing a reduced-key input device, such as a reduced-key QWERTY keyboard or a conventional telephone keypad having multiple alphabet characters assigned to each key. The system is configured to operate in a multi-tap mode for a user to specify a first or a second symbol (or a third, etc.) associated with a particular key.

The method 100 begins in step 102, wherein the method 100 evaluates whether or not a key has been pressed. It will be appreciated that in many systems activating an input key may generate an interrupt signal or other active signal to alert the operating system to the fact a keystroke has been received. Those of ordinary skill in the art will understand the many variations possible for interfacing a keyboard and an operating system.

While waiting for a keystroke, the method 100 also monitors whether or not a timeout has occurred in step 104. The timeout is a measure of the time since the most recent keystroke. If a sufficiently large period of time elapses, then the system presumes that the user is finished entering a character and may advance the cursor to the next location, as shown in step 106, to await further input. In step 106, a "current key" indicator is also cleared. If the timeout has not elapsed, then the system maintains the cursor at the present location to allow the user to re-type the same key, which may indicate that the user wants to enter the next symbol associated with key.

Note that a timeout count may not necessarily be running. For example, if a key has two associated symbols and a user enters the key twice in the multi-tap mode so as to select the second symbol for output to the display, then the system outputs the second symbol and advances the cursor. The system need not then run a timeout count in order to determine whether or not the user is finished specifying a symbol/character from the selected key. The user has reached the end of the sequence of possible characters associated with that key, so the system may presume that the user is finished selecting a character and may move to the next cursor location to await further characters. It will be understood that the conventional timeout count described above is a separate timing operation from the timing evaluation of the present invention described below.

If, in step 102, a keystroke is received, then the method 100 proceeds to step 108 where the keystroke is evaluated to determine if the key entered is the "next" key. The "next" key may be one or more keys that the user may enter to indicate he or she is finished entering a multi-tap sequence. For example, the "next" key may include an advance arrow key intended to allow the user to advance the cursor to the adjacent location. If the "next" key has been input, then in step 110 the cursor is advanced and the method 100 returns to step 102 to await further input; otherwise, the method continues at step 112. Step 110 also involves clearing the "current key" indicator.

In step 112, the method 100 determines whether the user has entered the same key as was most recently previously entered. The identity of this key may be stored as a "current key" indicator. As noted above in connection with steps 106 and 110, if a timeout occurs or the "next" key is entered then the "current key" indicator is cleared to indicate that the user has moved on to the next cursor location. If the user has entered the same key twice in succession, then the system recognizes that the user may be selecting the second symbol or character associated with the key.

If the keystroke is not received from the same key, then the system proceeds directly to step 116, where a symbol or character associated with the new key is output. At step 116, there are at least two possible outputs when a user enters a new key. First, if the cursor has been advanced to the next location due to, for example, a timeout or a "next" key, then the first symbol or character associated with the new key is output. Second, if the new key was entered prior to the cursor being advanced, then in step 116 the cursor is first advanced and then the first symbol or character associated with the new key is output.

If, in step 112, it is determined that the keystroke was from the same key, then in step 114 the method 100 attempts to resolve any ambiguity associated with the multi-tap input. In conventional systems, ambiguities are resolved based upon default rules. For example, in the context of a two-symbol-per-key system if a user strikes a key three times, the system presumes that the user has input the second symbol (two keystrokes) followed by the first symbol (the third keystroke). To override this default understanding to enter, for example, the first symbol followed by the second symbol, the user must use the "next" key or allow a timeout to occur between the first keystroke and the second keystroke.

In the present invention, at step 114 the method attempts to determine whether or not the default understanding is correct based upon the relative timing between the keystrokes. Using the relative timing between keystrokes, the system selects between a default output and an alternative output. Once that selection is made, the method 100 proceeds to step 116, where the selected output instructions are sent to the display.

Before returning to step 102 to await further keystrokes, the timeout counter may be restarted in step 118. At this stage, the "current key" indicator may also be set if a new key has been selected.

It will be appreciated by those of ordinary skill in the art that some of the steps or operations described above in connection with the method 100 may be performed in a different sequence or order without materially altering the operation of the method 100.

Figure 4:
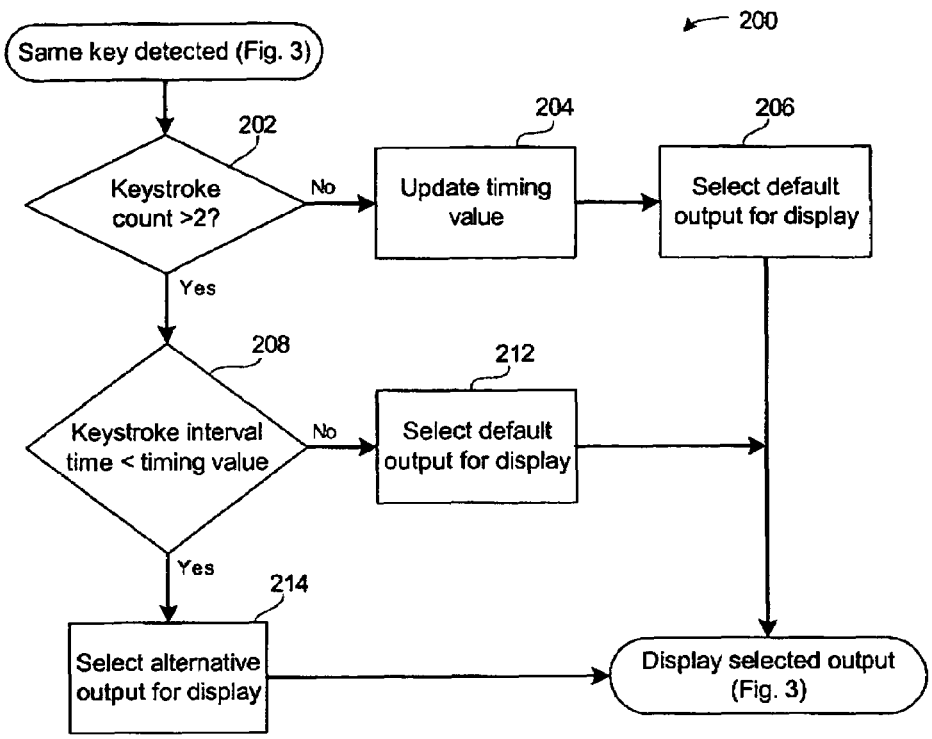
FIG. 4 shows, in flowchart form, a method for resolving ambiguities in multi-tap text input according to one embodiment of the present invention.

Reference is now made to FIG. 4, which shows, in flowchart form, a method 200 for resolving ambiguities in multi-tap text input, according to one embodiment of the present invention. The method 200 describes one embodiment of an implementation of step 114 from the method 100 shown in FIG. 3.

The method 200 resolves ambiguities in the context of a two-symbol-per-key input device and, in particular, resolves ambiguities resulting from receipt of three or more keystrokes from the same key. In this context, a typical default rule is that the first two keystrokes from a selected key indicate the user's selection of the second symbol associated with the key. The system then presumes the user is finished entering this character and the cursor is advanced. A subsequent keystroke of the same key is considered to be input regarding the next character. In other words, successive keystrokes are interpreted as cycling through the associated symbols or characters until the end (in this case the second symbol) is reached. This end symbol is output and subsequent keystrokes of the selected key are attributed to user input at the next cursor position. For example, in the case of a key having the letters E and R associated with it, two keystrokes would result in the output of the letter R. Three keystrokes would result in the output of the letters RE. Four keystrokes would result in the output of the letters RR. The output of the letters ER requires three keystrokes and, conventionally, requires that the default rules for interpreting keystrokes be overcome either by use of a "next" key or through a timeout.

The method 200 begins in step 202, where a keystroke count is evaluated. This count tracks the number of successive times that a selected key has been input. If the keystroke count is three or more, then the method 200 proceeds to step 208. Otherwise, the method 200 continues to step 204.

In step 204 (i.e. if the keystroke count is two), then the time elapsed between the first and second keystroke is used to update a timing value. The timing value may be solely based upon the time elapsed between the first and second keystroke or may be partially based upon such time elapsed. Other factors that may affect the timing value include the keystroke cadence (i.e. timing) received earlier in the same session, or stored present timing values. These various factors may be combined, in one embodiment using weighting factors, to determine the current-timing value.

In step 206, the output for display is determined based upon the default rules. In the present embodiment, the default output upon receipt of the second keystroke from a selected key comprises output of the second symbol and advance of the cursor to the next location in the text field. Following step 206, the determined output is provided to the graphics subsystem for display on the display device.

If the keystroke received is the third (or more) input of the same key, then in step 208 the system compares the time between the second keystroke and the third keystroke with the timing value. If the time between the second keystroke and the third keystroke is less than the timing value by a threshold amount, then the timing of the keystrokes may indicate a need to override the default output rules. For example, in an embodiment where the timing value is determined solely by the time between the first keystroke and the second keystroke, the comparison in step 208 is whether the time between the second and third keystrokes is less than the time between the first and second keystrokes by a threshold amount (which may be set to zero in some cases). If so, then it indicates that the user entered the second and third keystroke in closer succession than the user entered the first and second keystroke. The greater pause between the first and second keystroke may indicate that the user intends to output the first symbol followed by the second symbol, instead of the second followed by the first.

If the comparison indicates that the default rules should be overridden, then the method 200 continues in step 210, where an alternative output is selected. The alternative output in this case would involve moving the cursor back a location, changing the second symbol that would have been output previously (in step 206 following the second keystroke) to the first symbol, and then outputting the second symbol in the next location, followed by a cursor advance. If the comparison does not indicate that the default rules should be overridden, then the method 200 continues to step 112, where the default output, i.e. the first symbol, is selected as the output.

It will be appreciated that the timing value and the comparison between the timing value and the time elapsed between the second and third keystrokes is intended as an evaluation of the user's keystroke cadence. The relative length of the pauses between successive keystrokes of the same key may provide an indication of whether the user intends the keystrokes to trigger a multi-tap cycling of symbols associated with the key or whether the user intends the keystrokes to be separate. In this manner, the user may override the default multi-tap output rules based upon the timing (i.e. cadence) of his or her keystrokes, without the necessity of using a "next" key or waiting for a timeout to occur.

Those of ordinary skill in the art will therefore understand that the comparison may evaluate the pause between the second and third keystroke in comparison with the pause between the first and second keystroke, or it may evaluate it in comparison with other keystrokes. In other words, as described above the timing value may be adjusted over time as the user types various characters. The timing value may be continually adjusted as the user enters text into a particular text field in order to "learn" the user's unique keystroke cadence. The timing value may also comprise two timing values, one based upon the time between successive strokes of the same keys and one based upon the timing between strokes of different keys. The relative timing values developed in this manner may be used in the comparison step to determine whether a particular pause is indicative of a multi-tap input or separate character input. An excessive delay between keystrokes may be disregarded in updating the timing values on the basis that the user has likely interrupted his or her natural keystroke cadence to give some thought to the next character or word.

In an embodiment wherein the timing value is developed or learned as the user inputs a set of letters/characters, i.e. over the course of a "session" or during text entry in an active text field, the timing value may be used to disambiguate other multi-tap input cases. For example, when a user inputs a selected key twice, the user may intend that the second symbol be output to the display, which is the default understanding. Alternatively, the user may intend for the first symbol to be output twice.

Figure 5:
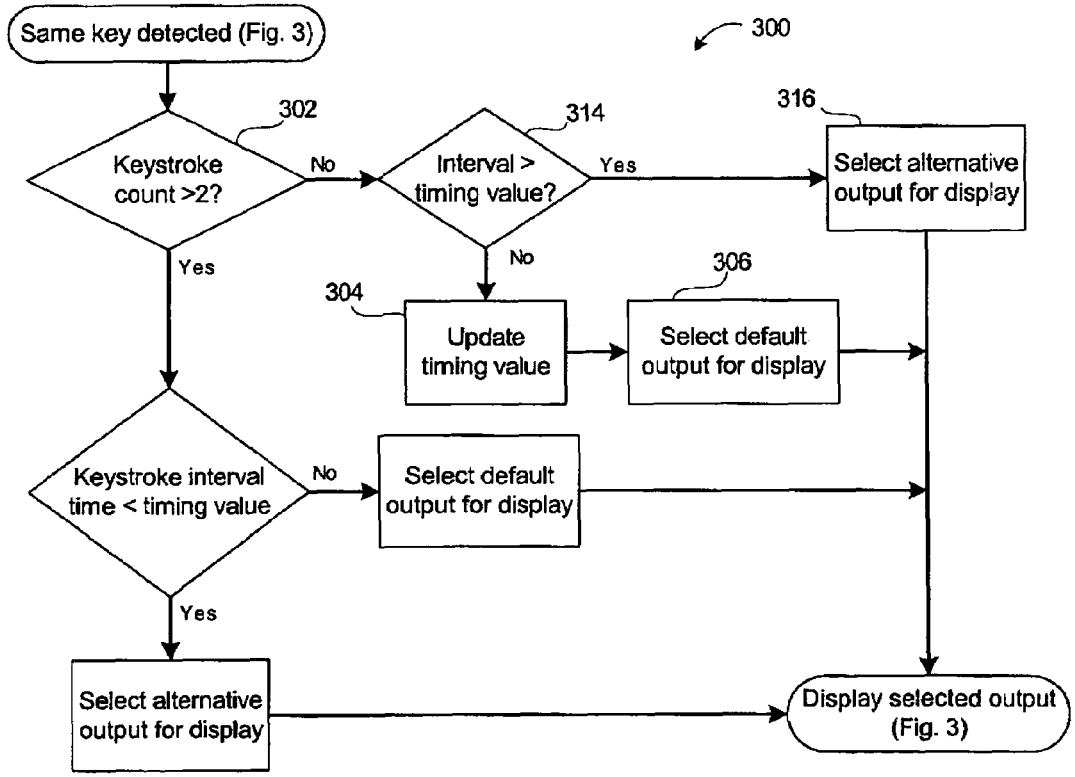
FIG. 5 shows, in flowchart form, a method for resolving ambiguities in multi-tap text input according to another embodiment of the present invention.

Reference is now made to FIG. 5, which shows a method 300 for resolving ambiguities in multi-tap text input, according to another embodiment of the present invention. The method 300 describes a variation of the method 200 shown in FIG. 4.

The method 300 begins in step 302 with an evaluation of the keystroke count. If the keystroke is the second successive keystroke of the selected key, then the method 300 proceeds to step 314, where the system compares the timing between the first and second keystrokes with a stored timing value. Based upon this comparison, the system determines whether the first and second keystrokes are indicative of multi-tap input or are separate inputs. This comparison may, for example, involve determining whether the delay between the first and second keystrokes is greater than the timing value by a threshold amount. If so, the large delay may be indicative of separate inputs, and the method 200 may continue at step 316.

In step 316, the system overrides the default rule of second symbol output with an output of two successive first symbols. In the case where the first symbol has already been output to the display once, then the specific output instructions developed at step 316 may include advancing the cursor and outputting the first symbol associated with the selected key.

If it is determined in step 314 that the timing between the first and second keystroke is not indicative of separate inputs, then the system treats the second keystroke as part of a multi-tap input and proceeds to steps 304 and 306.

Those of ordinary skill in the art will appreciate that the present invention is not limited to embodiments employing a reduced-key input device having only two symbols per key. It may also be employed in resolving ambiguities in multi-tap systems having three or more symbols per key, such as mobile telephones using text messaging technology.

In yet another embodiment, the timing-based evaluation of whether to override the default rules for interpreting multi-tap text input is subject to a linguistics-based evaluation of candidate results. In this embodiment, the multi-tap text module 60 (FIG. 1) employs predictive algorithms to enhance the ability to interpret multi-tap input ambiguities.

Accordingly, if a user provides the device 10 (FIG. 1) with three successive keystrokes of the key "ER", the multi-tap text module 60 may evaluate the candidate results based upon the probability information found in the dictionary and grammar rules database 64 (FIG. 2). The candidate results include ER, RE, and EEE. The preceding letters typed by the user may help resolve this ambiguity. For example, if the user typed "A" and then hit the "ER" key three times, the multi-tap text module 60 would evaluate the likelihood that the user intended to type AER, ARE, or AEEE. The result ARE is the most likely result as it is a common word. Accordingly, the multi-tap text module 60 may set the output to be RE. However, the letters AER constitute a prefix to less common words, such as AEROPLANE. Accordingly, the multi-tap text module 60 may provide the user with a selection list containing alternatives if the user intended something other than the most likely result.

The linguistics-based approach to resolving ambiguities in multi-tap text input may be used to supplement the keystroke timing-based approach. In such an embodiment, the keystroke timing-based approach described above may produce a decision on whether to apply the default rules or output an alternative result. These two candidate outputs may be checked using linguistic rules to assess the likelihood of either being correct. If the linguistic rules confirm the result from the timing-based approach, then the device 10 may output the result. If the linguistic rules conflict with the result arrived at using timing-based approach, the result may be output with a selection list of alternatives in case the result is inaccurate.

Those of ordinary skill in the art will appreciate that a variety of linguistic-based predictive algorithms may be employed to varying degrees to determine the probability that one result is more likely to be correct than another. These algorithms may be combined in a variety of manners with keystroke timing results to improve the accuracy of the multi-tap text module 60 in resolving ambiguities. In one embodiment, the keystroke timing results and the linguistic-based testing are combined to determine the probability that an alternative output was intended. The device 10 displays the alternative output if the probability exceeds a predetermined threshold.

It will also be appreciated that a selection list may be output to the display screen in other contexts. In general, a selection list showing alternative outputs may be displayed for the user any time that an ambiguity exists regarding two or more possible interpretations of the user input. For example, when the user inputs two of the same keystrokes and the default rule is that the second symbol is displayed, a selection list may be provided showing two first symbols as an alternative output. In another example, the present invention may determine based upon the keystroke timing that the user intended two first symbols and may override the default rule to send this output to the display. A selection list containing the default output of one second symbol may be-output as well so as to allow the user to select the second symbol if, despite the keystroke timing, he or she intended to select the second symbol. Other situations in which a selection list may be output will be apparent to those of ordinary skill in the art in view of the foregoing description.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for resolving ambiguities in multi-tap text input received through a reduced-key input device, a key of the input device having at least two associated text characters, the method comprising the steps of:
    receiving a first keystroke signal associated with the key;
    receiving a second keystroke signal associated with the key;
    receiving a third keystroke signal associated with the key;
    setting a timing value as the time elapsed between said first keystroke signal and said second keystroke signal;
    comparing a time between said second keystroke signal and said third keystroke signal with said timing value; and
    selecting between a default display output and an alternative display output based upon said comparison.

2. The method claimed in claim 1, wherein said step of comparing includes determining if said time differs from said timing value by more than a threshold amount.

3. The method claimed in claim 1, wherein the at least two associated text characters include a first character and a second character and wherein said default display output comprises said second character followed by said first character and said alternative display output comprises said first character followed by said second character.

4. The method claimed in claim 3, wherein said alternative display output is selected if said time is less than said timing value by a threshold amount.

5. The method claimed in claim 1, further comprising a step of testing said default display output and said alternative display output using linguistic rules to produce at least one probability, and wherein said step of selecting is at least partially based upon said at least one probability.

6. The method claimed in claim 5, wherein a combination of said comparison and said testing determines said selection.

7. The method claimed in claim 1, further comprising the step of adding a threshold value to the timing value.

8. A multi-tap text input system for use with a device receiving multi-tap text input, the system comprising:
    a keystroke timing component for storing keystroke timing information including a timing value; and
    a multi-tap text input module for receiving first, second and third keystroke input signals associated with a key, the multi-tap input module having a timing module for setting said timing value as the time elapsed between said first keystroke input signal and said second keystroke input signal and for determining a time between said second and third keystroke input signals, a comparison component for comparing said timing value with said time determined by said timing module, and a selection component, wherein said selection component selects between a default display output and an alternative display output in response to said comparison component.

9. The multi-tap text input system claimed in claim 8, wherein said device comprises a mobile .device having a reduced-key input interface.

10. The multi-tap text input system claimed in claim 9, wherein said reduced-key input interface comprises a reduced-key QWERTY keyboard.

11. The multi-tap text input system claimed in claim 8, wherein said comparison component calculates a difference between said time and said timing value and determines whether said difference exceeds a threshold value.

12. The multi-tap text input system claimed in claim 8, wherein said key has at least two associated text characters including a first character and a second character and wherein said default display output comprises said second character followed by said first character and said alternative display output comprises said first character followed by said second character.

13. The multi-tap text input system claimed in claim 12, wherein said selection component selects said alternative display output if said comparison component determines that said time is less than said timing value by a threshold amount.

14. The multi-tap text input system claimed in claim 8, further comprising a database storing linguistic data and a linguistic testing component for testing said default display output and said alternative display output against said linguistic data.

15. The multi-tap text input system claimed in claim 14, wherein said linguistic testing component outputs at least one probability, and wherein said selection component selects between said alternative display output and said default display output at least partially based upon said probability.

16. The multi-tap text input system claimed in claim 8, wherein said timing module adds a threshold value to the timing value.

17. A mobile device, comprising:
a reduced-key input device;
a display;
a memory containing keystroke timing information including a timing value; and
a multi-tap text input module for receiving first, second and third keystroke input signals associated with a key, the multi-tap input module having a timing module for setting said timing value as the time elapsed between said first keystroke input signal and said second keystroke input signal and for determining a time between said second and third keystroke input signals, a comparison component for comparing said timing value with said time determined by said timing module, and a selection component, wherein said selection component selects between a default display output and an alternative display output in response to said comparison component.

18. The mobile device claimed in claim 17, wherein said reduced-key input device comprises a reduced-key QWERTY keyboard.

19. The mobile device claimed in claim 17, wherein said comparison component calculates a difference between said time and said timing value and determines whether said difference exceeds a threshold value.

20. The mobile device claimed in claim 17, wherein said key has at least two associated text characters including a first character and a second character and wherein said default display output comprises said second character followed by said first character and said alternative display output comprises said first character followed by said second character.

21. The mobile device claimed in claim 20, wherein said selection component selects said alternative display output if said comparison component determines that said time is less than said timing value by a threshold amount.

22. The mobile device claimed in claim 17, further comprising a database storing linguistic data and a linguistic testing component for testing said default display output and said alternative display output against said linguistic data.

23. The mobile device claimed in claim 22, wherein said linguistic testing component outputs at least one probability, and wherein said selection component selects between said alternative display output and said default display output at least partially based upon said probability.

24. The mobile device claimed in claim 17, wherein said timing module adds a threshold value to the timing value.

* * * * *